United States Patent [19]

Santon et al.

[11] Patent Number: 5,058,162
[45] Date of Patent: Oct. 15, 1991

[54] METHOD OF DISTRIBUTING COMPUTER DATA FILES

[75] Inventors: John C. Santon, Johnstown; Kenneth R. Nielsen, Loveland, both of Colo.; Christen M. Armbrust, Boulder Creek, Calif.; Pankaj B. Shah, Santa Clara, Calif.; Steven J. Hand, San Jose, Calif.

[73] Assignee: Hewlett-Packard Company, Palo Alto, Calif.

[21] Appl. No.: 564,911

[22] Filed: Aug. 9, 1990

[51] Int. Cl.⁵ .................. H04K 1/00; H04K 9/00; H04L 9/00
[52] U.S. Cl. .................................. 380/25; 364/200; 364/900; 380/4
[58] Field of Search ............... 364/200, 900; 380/23, 380/25, 45, 4

[56] References Cited

U.S. PATENT DOCUMENTS

3,670,310  6/1972  Bharwami ................. 235/157
4,604,686  8/1986  Reiter et al. ............. 364/200
4,757,533  7/1988  Allen et al. .............. 380/25

Primary Examiner—Stephen C. Buczinski

[57] ABSTRACT

A method of distributing a plurality of data files to a plurality of recipients including the steps of: placing encrypted copies of the data files to be distributed on a plurality of identical media and providing the recipients with media reading devices having data file decryption capability; logically arranging the data files into data file groups; in response to a recipient's request for access to selected file groups providing the recipient with a group access map indicative of the file groups to which access is requested; in further response to a recipient's request for access to selected file groups providing the recipient with a password to be used for access verification; completing an access verification operation using the group access map and the password and data indicative of the media being read and data indicative of the reading device being used; providing access to the data files in the file groups to which access is requested by use of the group access map; and decrypting the accessed data files.

17 Claims, 5 Drawing Sheets

| REGION STARTING ADDRESS | ASSIGNED GROUP # OF REGION |
|---|---|
| 0 | 7 |
| 26 | 1 |
| 92 | 24 |
| 250 | 0 |
| 312 | 2 |
| 419 | 0 |
| 586 | 15 |
| 635 | 4 |
| 770 | 5 |
| 922 | 4 |
| 2920 | 18 |
| 3356 | 2 |

| DRIVE ELECTRO/MECHANICAL ASSEMBLY (110) | DRIVE CONTROLLER HARDWARE (112) | DRIVE CONTROLLER FIRMWARE (114) |
|---|---|---|
| | | SECOND ENCRYPTION KEY (124) |
| | DECRYPTION CHIP (120) | UNIQUE DRIVE IDENTIFIER (126) |
| | | SECURITY SOFTWARE PROGRAM (128) |

METHOD OF DISTRIBUTING COMPUTER DATA FILES

BACKGROUND OF THE INVENTION

The present invention relates generally to a method of distributing computer software and, more particularly to a method of distributing computer software which enables a software distributor to provide multiple data files on a distribution media, to distribute identical copies of the media to a plurality of potential software users, and to selectively provide different software users with access to different sets of data files contained on the media.

Computer data files, e.g. word processing software, engineering application software, mailing lists, etc., are generally distributed by software publishers to software users on media which contain data files for only that software which the user has purchased. However in the case of institutional software distribution such as distribution to universities or large commercial organizations, publishers often bundle together a large number of different software programs on a single media volume such as a large data storage tape. Identical copies of this large capacity volume are then distributed to each of the publisher's institutional clients. Updated copies of the large capacity volume are generally distributed to clients at periodic intervals, e.g. monthly. A significant cost savings is achieved by the publisher through such large volume distribution of software due to efficiencies in both media costs and copying costs as compared to costs of preparing and distributing individual software programs on separate, low capacity media.

However, a drawback to this method of distributing institutional software on identical large volumes has been that not all institutional customers are interested in the same software. Typically each customer is interested in only some small portion of the software which is available on each large volume. Yet the customer, in order to gain access to the software which is desired, must pay for the entire volume. Due to the practical difficulty in requiring a customer to pay for software which the customer does not desire, the unit price for software which is distributed on such large identical volumes must necessarily be much lower than the unit price of software which is distributed as individual programs on small capacity media. An associated problem is that once a large volume of media is released to a customer, all of the software programs contained on the volume may be subject to unauthorized copying.

The copying costs associated with providing large "customized" software volumes to each institutional customer which contains only the software which each customer has actually ordered make this method of distribution expensive.

The present invention seeks to combine the media cost and copying cost efficiencies associated with providing numerous data files on a single large capacity media volume with the pricing efficiencies associated with providing individual software programs on separate low capacity media volumes. The present invention is particularly adapted to exploit the high capacity and relatively low copy cost associated with publishing software on ROM disks.

SUMMARY OF THE INVENTION

The present invention is directed to a software distribution method which achieves a number of desireable results for a software distributor.

All of the software which is to be distributed to a particular set of customers may be distributed on identical large capacity media volumes rather than media volumes which are unique to each customer. Thus the distributor's production costs are significantly reduced as compared to customer specific distribution methods.

The distributors's customers are provided with specially adapted reading devices. Data files on the media are encrypted and only those software users which have been provided with the specially adapted reading devices are capable of reading the data files in a usable form. The encryption "keys" needed to decrypt the data files are provided on the media and the specially adapted reading devices but are not directly accessible by software users. Thus, the risk of authorized software users making unauthorized use of the encryption keys or divulging the encryption keys to unauthorized users is obviated.

By use of a technique employing two encryption keys, a unique key for each new media release which is provided on the media itself and a "generic" key which is provided on each media reading device, each new edition of the media may be encrypted with a different key and yet still be decryptable by use of the specially adapted reading devices without modification of the firmware of the reading devices.

A technique of providing a customer a "group access map" which is compared by a security program installed in the reading device to a "region access map" on the media allows the software distributor to precisely designate different file group access for different customers.

The invention employs a password based access verification procedure which utilizes identifiers specific to a particular media release, a particular reading device and a particular set of data files. This verification procedure limits a customer's access to only those data files of a particular media release for which he has been granted access authorization by the distributor. The particular password provided to one customer is not usable by other customers due to the system's use of different reading device identifiers. Similarly the password used by a customer to gain access to files on one media release is not usable to gain access to files on a subsequent release due to the use of different media identifiers on each new release.

The present invention may comprise a method of distributing a plurality of data files to a plurality of recipients including the steps of: placing encrypted copies of the data files to be distributed on a plurality of identical media and providing the recipients with media reading devices having data file decryption capability; logically arranging the data files into data file groups; in response to a recipient's request for access to selected file groups providing the recipient with a group access map indicative of the file groups to which access is requested; in further response to a recipient's request for access to selected file groups providing the recipient with a password to be used for access verification; completing an access verification operation using the group-access map and the password and data indicative of the media being read and data indicative of the reading device being used; providing access to the data files in the file groups to which access is requested by use of the group access map; and decrypting the accessed data files.

The invention may also comprise a method of distributing a plurality of data files to a plurality of recipients including the steps of: creating a plurality of identical media which each contain copies of the plurality of data files encrypted with a first encryption key and which each contain a copy of the first encryption key encrypted with a second encryption key; providing each of the recipients with a media reading device having a machine readable copy of the second encryption key stored therein; initiating reading of one of the media on one of the media reading devices; reading the stored copy of the second encryption key; using the read copy of the second encryption key to decrypt the encrypted copy of the first encryption key which is provided on the media; and using the decrypted first encryption key to decrypt the encrypted data files on the media.

The invention may also comprise a method of distributing a plurality of data files to a plurality of recipients including the steps of: creating a set of identical media which contain copies of the plurality of data files, a media identifier, and a security program initiator; providing the recipients with secured media reading devices which each contain a common security program and which each contain a unique reading device identifier; initiating reading of one of the media on one of the media reading devices; initiating the security program in response to reading the security program initiator; inputting to the reading device a group access map indicative of particular files which are to be accessed; inputting to the reading device a password which is correlated to the unique reading device identifier of the reading device being used and to the media identifier of the media being read and to the input group access map; utilizing the security program to access the unique reading device identifier of the reading devices and the media identifier of the media being read; performing a verification operation to establish that a predetermined correlation exists among the password, reading device identifier, media identifier, and group access map; and providing access to the selected data files indicated by the group access map in response to establishing the correlation.

The invention may also comprise a method of providing access to selected sets of data files which are provided on a digital data storage media including the steps of: logically assigning each data file to a file group based upon predetermined criteria and assigning a unique file group number to each file group; logically dividing the area on the disk on which data files are stored into a plurality of contiguous physical regions wherein each data file is contained within a single region and wherein no region contains data files of more than one file group; providing a region access map indicating the group number of the files in each region and indicating the disk location of each region and providing the region access map list on the media; creating a group access map indicating the file group numbers of the file groups to which access is desired; comparing the group access map to the region access map to determine the region locations of the data files in each of the file groups to which access is desired; and providing access to each of these determined regions.

The invention may also comprise a method of distributing a plurality of data files to a plurality of recipients including the steps of: creating a plurality of identical media which each contain copies of the plurality of data files encrypted with a first encryption key, a copy of the first encryption key encrypted with a second encryption key, a media identifier, and a security program initiator; logically assigning each data file to a file group based upon predetermined criteria and assigning a unique file group number to each file group; logically dividing the area on the disk on which data files are stored into a plurality of contiguous physical regions wherein each data file is contained within a single region and wherein no region contains data files of more than one file group; providing a region access map indicating the group number of the files in each region and indicating the disk location of each region and providing the region access map on the media; creating a group access map indicating the file group numbers of the file groups to which access is desired; providing each of the recipients with a media reading device having firmware including a copy of the second encryption key, a unique reading device identifier, and a security program; initiating reading of one of the media on one of the media reading devices; initiating the security program in response to reading the security program initiator; inputting to the reading device the group access map indicative of particular file groups which are to be accessed; inputting to the reading device a password which is correlated to the unique reading device identifier of the reading device being used and to the media identifier of the media being read and to the input group access map; utilizing the security program to access the unique reading device identifier of the reading devices and the media identifier of the media being read; utilizing the security program to perform a verification operation to establish that a predetermined correlation exists among the password, reading device identifier, media identifier, and group access map; utilizing the security program to compare the group access map to the region access map to determine the region locations of the data files in each of the file groups to which access is desired and providing a recipient access to each of these determined regions; utilizing the security program to read the stored copy of the second encryption key; utilizing the security program to use the read copy of the second encryption key to decrypt the encrypted copy of the first encryption key which is provided on the media; and utilizing the security program to use the decrypted first encryption key to decrypt the encrypted data files on the media regions accessed by the recipient.

BRIEF DESCRIPTION OF THE DRAWING

An illustrative and presently preferred embodiment of the invention is shown in the accompanying drawings in which.

DETAILED DESCRIPTION OF THE INVENTION

Figure 1:
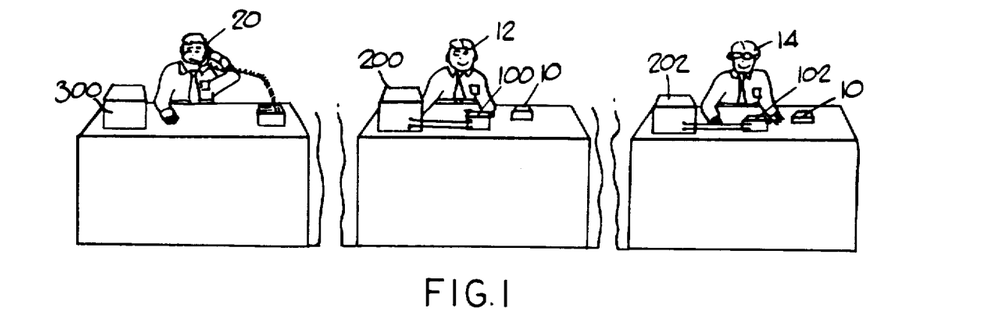
FIG. 1 is a schematic illustration of a software distributor, software users, software distribution media, and media reading devices.

As illustrated in FIG. 1, identical copies of a secured media such as read-only, compact laser disk 10 (hereinafter ROM disk 10 or simply disk 10) are supplied to a plurality of different software users 12, 14 by a software distributor 20. Each disk 10 contains many different data files 15, 16, etc., FIG. 2. Each data file belongs to a particular file group. Each of these file groups provides a software module which a software user may desire to use. For example, one file group may contain a single word processing program; another file group may contain a structural engineering design program and an engineering drawing program; another file group may contain a text file telephone directory of a particular geographic region, etc.

Figure 2:
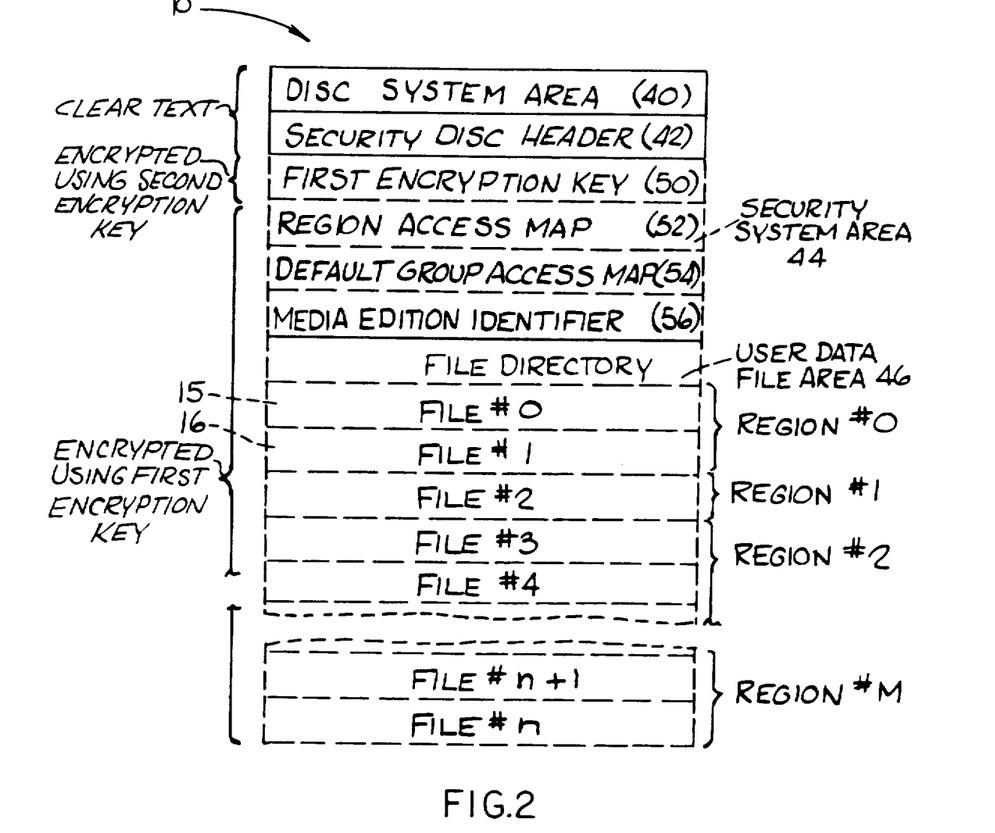
FIG. 2 is a schematic illustration of the contents of a secured software distribution media.

The disks 10 are secured in a manner which enables the distributor to limit access to data files on the disk to software users having media reading devices, e.g. 100/200, which have been provided with special security identifier data and software by the distributor. The distributor is able to limit the access of software users having such special reading devices to only those file groups to which a particular software user has been granted access authority by the distributor.

Each ROM disk 10 has a continuous spiral-shaped path upon which data is stored. FIG. 2 is a schematic illustration showing different areas of the disk on which information is stored. The first area on which information is stored corresponds to the area which the drive 100 would read first at system start-up. This area is a conventional disk system area 40 and contains data which enables the disk reader to properly interface with the disk being read. Such start-up regions on ROM disks are conventional and well-known in the art. The disk system area 40 is written in clear text, i.e. the data is not encrypted and may be read by any ROM disk reading device.

A security disk header 42 is provided in the area of the disk immediately after the disk system area 40. The security disk header 42 is also written in clear text and provides data which alerts the reading device to the fact that the disk being read is a secured disk.

The next area immediately after the security disk header 42 is the security system area 44 which contains various data used in implementing disk security.

The first region in security system area 44 contains a first encryption key 50. The security system area 44 also contains a region access map 52, a default group access map 54, and a media edition identifier 56, each of which is described in further detail below.

The next disk area immediately after the security system area 44 is the user data file area 46 which contains a file directory and a series of data files 15, 16, etc., which are numbered sequentially in the drawing for purposes of explanation as file no. "0" through file no. "n". Each file group which a user may desire to obtain access to includes one or more of these data files. However the data files which belong to any particular file group are not necessarily contiguous.

One technique which is used according to the present invention for securing media 10 is "data encryption".

Data encryption refers to the scrambling of a set of data according to a set procedure such that the scrambled data is unusable by unauthorized parties but such that the data may be unscrambled by parties having knowledge of the scrambling procedure. One method of encrypting data known in the industry as the "Data Encryption Standard" or "DES" utilizes a device such as a microprocessor which employs a plurality of algorithms which operate on an input data string and which output a scrambled string of data of identical size to that which was input. The algorithms which operate on the input data may be varied in accordance with a predetermined procedure which is determined by a separate set of data referred to as an "encryption key" or simply a "key". The DES device may be operated in a decryption mode to perform an unscrambling operation on decrypted data which is the inverse of the encryption operation. Thus, through use of a DES chip operating in an encryption mode which is supplied with a predetermined encryption key, a set of data files may be encrypted in a manner which renders them unusable by unauthorized personnel. These encrypted data files may subsequently be returned to their original form through use of an identical encryption chip operating in a decryption mode which has been supplied with the same encryption key which was used to encrypt the files. The media security system of the present invention employs data encryption according to a novel method.

The first encryption key 50 which is stored in the first region of the security area is encrypted using a predetermined encryption standard such as that provided by using predetermined encryption software, or, in the preferred embodiment, by using an encryption chip which may be a Data Encryption Standard (DES) chip such as a Z8068 Data Cyphering Processor manufactured by Zilog, Inc., 210 Hacienda Avenue, Campbell, Calif. 95008-6609. The encryption of the first encryption key is performed using a second encryption key with the encryption device. The remainder of the system area 44 and the user data file area 46 is encrypted using the same encryption device and using the first encryption key (in its unencrypted form) with the encryption chip.

Figure 3:
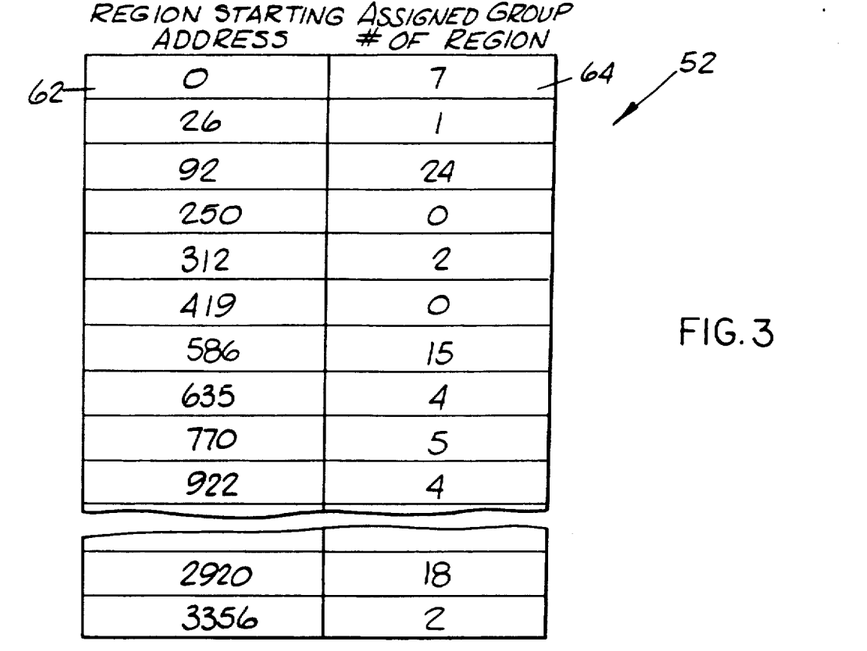
FIG. 3 is an illustration of typical data contained in a region access map.

The region access map 52 is a security directory, FIG. 3, which logically divides the user data file area 46 of the disk into a series of contiguous physical regions for the purpose of identifying where data files assigned to various file groups are located. Each defined region in the user data file area 46 contains one or more contiguous files of a single file group but not necessarily all of the files of that particular file group. In other words, each region is assigned to a group. Multiple regions can be assigned to a single group, but a single region can only be assigned to one group. The region access map comprises a listing 62 of the starting address of each region and a corresponding list 64 of the group to which each region is assigned. Each region terminates at the beginning of the next succeeding region. FIG. 2 schematically illustrates how the user data file area is divided into contiguous regions which are numbered "0" through "m" for purposes of explanation.

Figure 4:
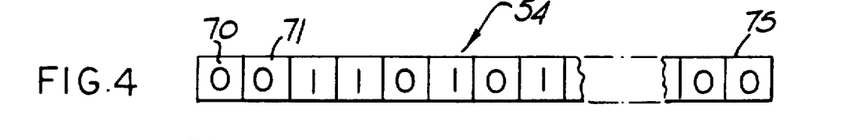
FIG. 4 is an illustration of typical data contained in a default group access map.
Figure 5:
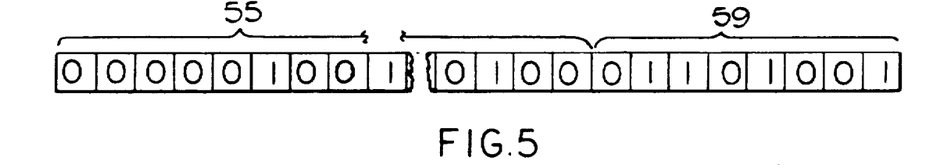
FIG. 5 is an illustration of typical data contained in a group access map and password.

FIG. 4 illustrates the default group access map 54 which simply comprises a string of "p" binary digits. The first digit in the string, indicated by reference numeral 70, represents the security status of the first file group, the second binary digit 71 represents the security status of the second file group, the pth digit in the string 75 represents the security status of the pth file group on the disk. In one preferred embodiment, a security status of unlocked is represented with a "0", and the security status of locked is represented with a "1". The default group access map 54 is used by security software 128 in association with the region access map 52 to allow or prevent access to the various file groups on the disk, as further explained below. The default group access map designates a "default set" of file groups to which a user is provided access without entering a password. A user may obtain access to additional file groups by inputting a new group access map 55 and a corresponding password 59 supplied by the software distributor. The new group access map 55 which is input by the customer is identical in form to the default group access map 54 but designates different file group access authority. In one embodiment of the invention the new group access map 54 and the corresponding password 59 are provided to the software user by the distributor as a single codeword 55/59 as illustrated in FIG. 5.

Figure 6:
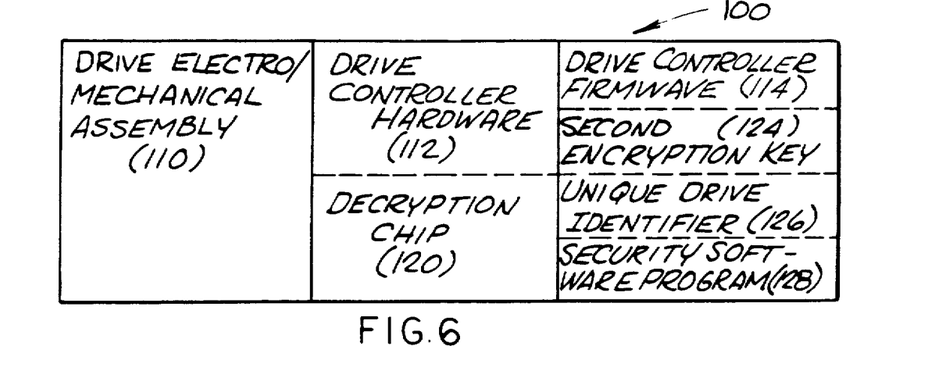
FIG. 6 is a schematic drawing of major components of a disk drive.

As previously mentioned, each user is provided with a reading device which may comprise a disk drive 100 and a host computer 200. The reading device 100/200 is configured by the distributor to implement the disk security function when a user attempts to read a secured disk 10 and otherwise operates in the same manner as a conventional disk reading device. In one preferred embodiment, the various security features of the reading device are all provided on the disk drive 100, as opposed to the host computer 200. Various components of the disk drive 100 are illustrated in FIG. 6. The disk drive may comprise a conventional drive electromechanical assembly 110. The drive is also provided with conventional drive controller hardware 112 and drive controller firmware 114. In addition to the conventional controller hardware, the drive is provided with a decryption chip 120 which in one preferred embodiment is a Data Encryption Standard (DES) chip such as a Z8068 Data Cyphering Processor manufactured by Zilog, Inc., 210 Hacienda Avenue, Campbell, Calif. 95008-6609. The decryption chip 120 may comprise an identical chip to that which is used to encrypt the first encryption key 50 and user data files 15, 16 which are provided on the ROM disk 10. However, the chip on the drive controller is used only in the decryption mode of operation.

The drive controller firmware 114, in addition to conventional firmware, comprises a second encryption key 124, a unique drive identifier 126, and a security software program 128.

The method by which a software user obtains access to a data file group will now be described at the software user level.

The software user 12 is provided with a ROM disk 10 and a disk drive 100 which has been configured by the software distributor 20 as described above. The disk drive in addition to novel security features may contain conventional ROM disk drive and magnetic disk drive features such as those provided on Models 9127A and 9135C magnetic disk drives manufactured and sold by Hewlett-Packard Company. The disk drive 100 is operably attached to the user's computer 200 which may comprise a conventional minicomputer or microcomputer such as a Series 300 minicomputer manufactured and sold by Hewlett-Packard Company.

The software user 12 is also provided by the software distributor 20 with a list of data file groups to which he may obtain access by inputting the proper code number. The software user selects one or more file groups from this list and then contact the software distributor 20 and informs the distributor of his selection. The distributor has in his possession, such as in a computer storage device 300, a list indicating the unique drive identifier for the drive 100, 102, etc. which is assigned to each software user 12, 14, etc. Based upon the unique drive identifier assigned to the drive of the software user 12 requesting access, and based upon the file groups which the software user 12 desires to access, and based upon the media edition identifier of the ROM disk 10 which the software user 12 has in his possession, the distributor determines a unique code word 55/59, FIG. 5, which he furnishes to the software user 12. The software user 12 then places disk 10 in the disk drive and initiates operation of the disk drive. He next inputs the code word 55/59 provided to him by the distributor when prompted by his host computer 200. If the code word provided to him by the distributor 20 corresponds correctly to the disk drive 100 and to the edition of the media 10 which the software user 12 is reading, security software on the disk drive 100 provides the user access to the selected file groups and decrypts the data in each of the selected file groups before transmitting it to the host computer 200.

Figure 7A:
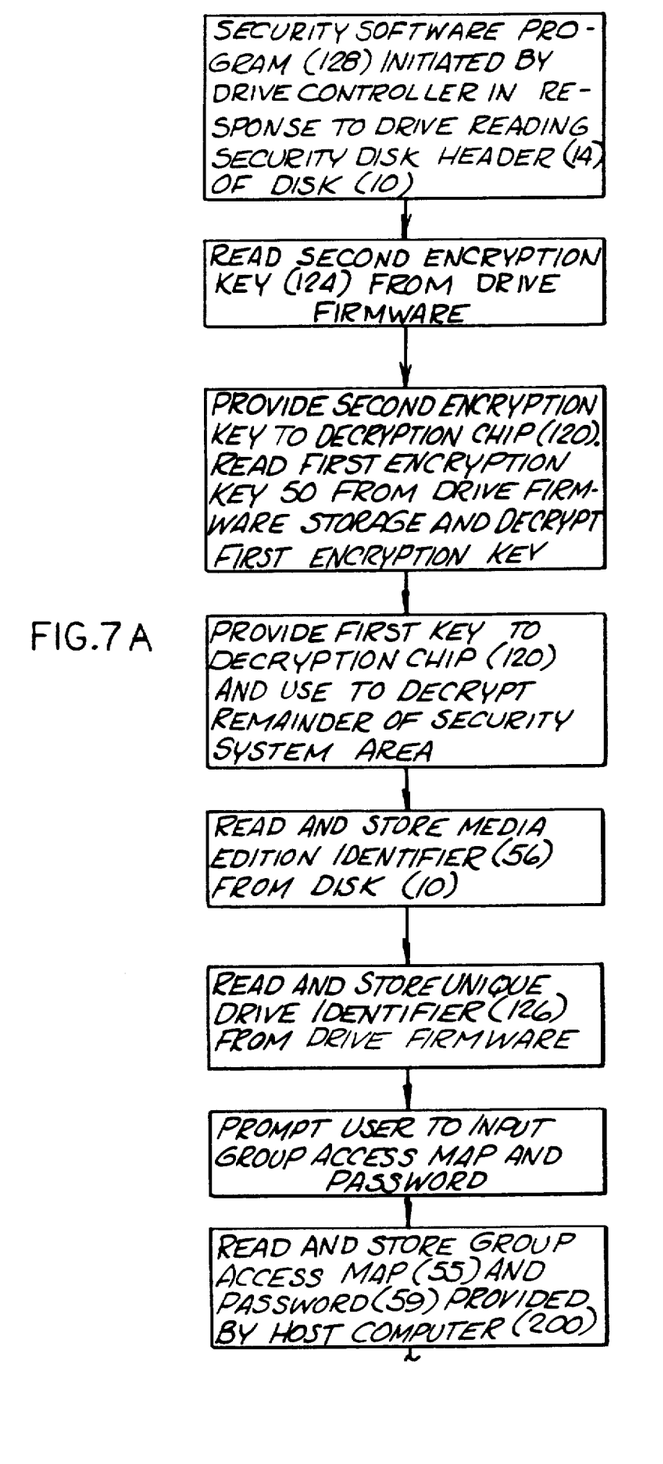
FIG. 7 is a block diagram illustrating the operation of a security software program.
Figure 7B:
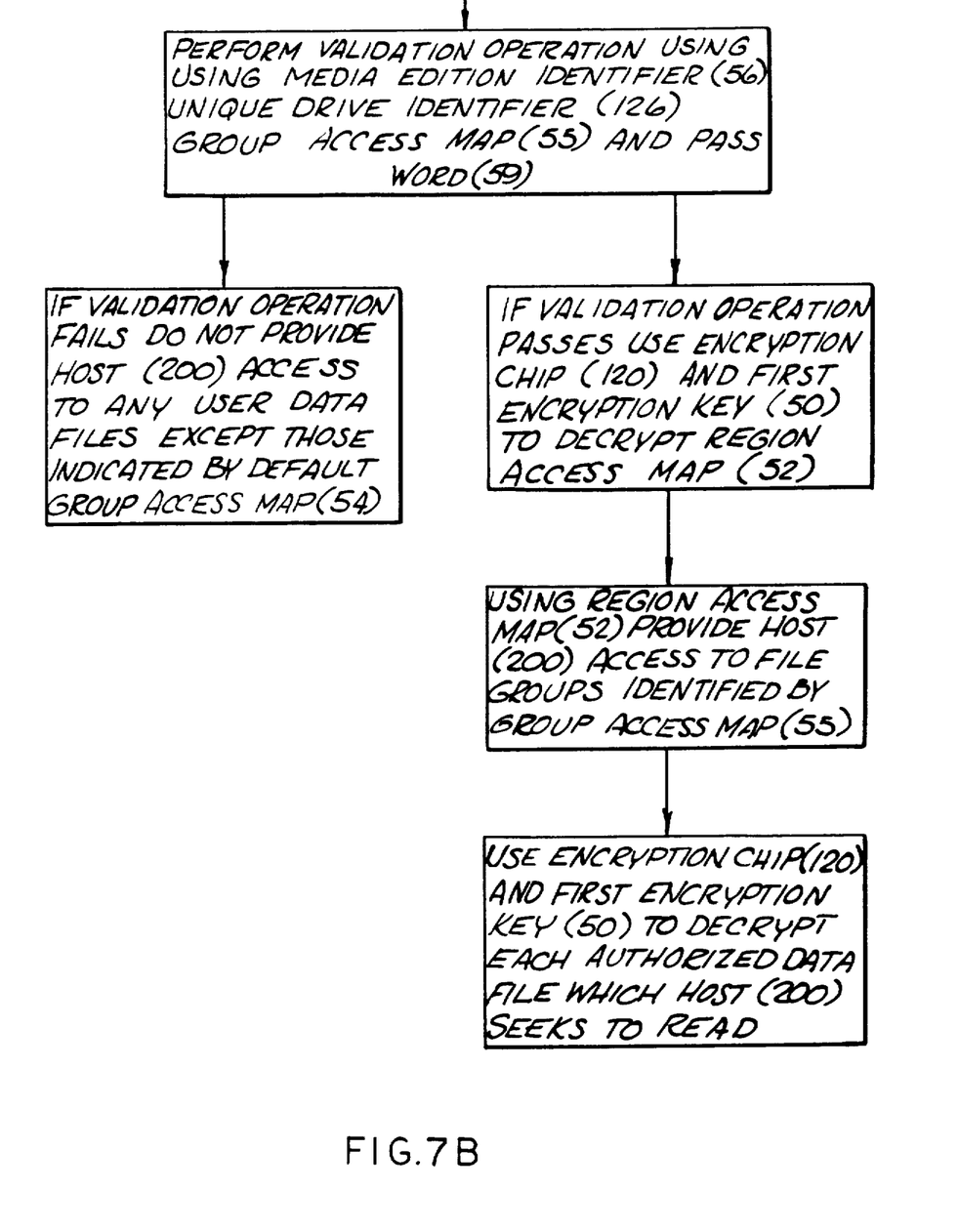

The various substantive tasks which the security software program 128 of one preferred embodiment performs will now be described with reference to FIG. 7. The security software program 128 is initiated by other drive controller firmware 114 in response to the drive's reading of the security disk header 14 of disk 10. Next, the security software program reads the second encryption key 124 from the drive firmware. The security software program next provides the second encryption key to the decryption chip 120. Next, the security software program reads the encrypted first encryption key 50 from the drive firmware and instructs the decryption chip 120 to decrypt the first encryption key.

The security software program provides the decrypted first encryption key to the decryption chip 120 and instructs the decryption chip 120 to decrypt the media edition identifier from the security system area. Next, the security software program reads and stores the decrypted media edition identifier 56.

Next, the security software program reads and stores the unique drive identifier 126 from the drive firmware.

Next, the host computer 200 prompts the user to input the code word provided to him by the software distributor 20. The code word which is input comprises two parts, a group access map 55 and a password 59, which have different functions within the security program as described in further detail below.

Next, the security software program reads and stores the input group access map and password provided from the host computer 200.

Next, the security software program performs a validation operation using the media edition identifier 56, the unique drive identifier 126 and the group access map and the password provided by the user. If the validation operation fails, the user is provided access to only those user data files indicated by the default group access map. If the validation operation passes, the security program provides the encryption chip with the first encryption key 50 and instructs it to decrypt the region access map in the security area of disk 10.

Next the security program compares the input group access map to the decrypted region access map and unlocks (provides access to) those regions on the disk which are authorized by the group access map.

Finally the security program instructs the encryption chip 120, using the first encryption key 50 to decrypt any file which the user seeks to access in the unlocked regions of the disk 10. The data provided to the host computer 200 is clear text.

The validation operation performed by the security software program 128 will now be described in further detail with reference to FIG. 8. First, the security software provides a copy of the unique drive identifier 126 to the encryption chip 120 which uses it as a key. Next, the security software instructs the chip to decrypt the media edition identifier 56. Next, the security software instructs the chip 120 to decrypt the group access map portion of the code word which was input by the software user. Next, the security software segments the decrypted group access map into a series of numbers of a predetermined digit length numbers and then adds the individual numbers provided by these segments together. To that sum the security program adds the number represented by the decrypted media edition identifier to obtain a final sum. Next, this final sum or "check sum" is compared to the password 59 which is also represented as a number. If the check sum is identical to the password, then the validation operation passes; if not, the validation operation fails.

Figure 8:
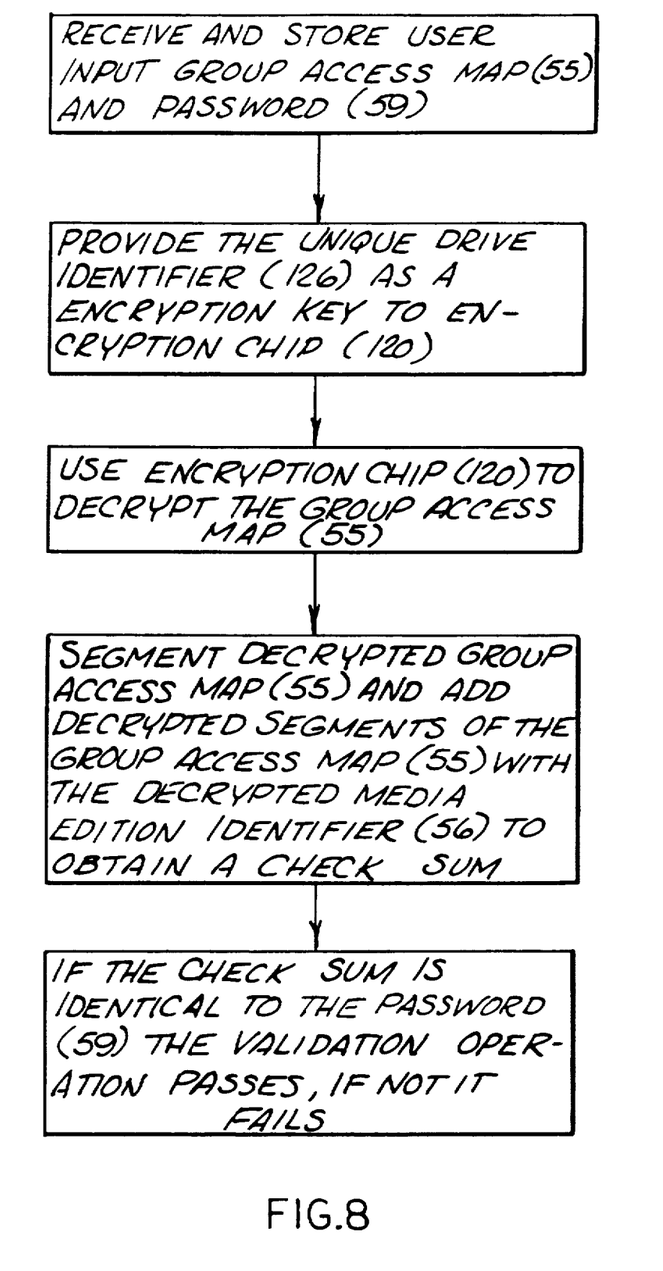
FIG. 8 is a block diagram illustrating a group access map validation operation of a security software program.

It will be appreciated by those having skill in the art that the same method described in FIG. 8 for performing a validation operation may also be performed, except for the last step, by the distributor 20 in order to initially compute the password which must be provided to the software user.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of distributing a plurality of data files to a plurality of recipients comprising the steps of:
   a) placing encrypted copies of the data files to be distributed on a plurality of identical media and providing the recipients with media reading devices having data file decryption capability;
   b) logically arranging the data files into data file groups;
   c) in response to a recipient's request for access to selected file groups providing the recipient with a group access map indicative of the file groups to which access is requested;
   d) in further response to a recipient's request for access to selected file groups providing the recipient with a password to be used for access verification;
   e) completing an access verification operation using the group access map and the password and data indicative of the media being read and data indicative of the reading device being used;
   f) providing access to the data files in the file groups to which access is requested by use of the group access map; and
   g) decrypting the accessed data files.

2. The method of claim 1 wherein step (a) comprises:
creating a plurality of identical media which each contain copies of the plurality of data files encrypted with a first encryption key and which each contain a copy of the first encryption key encrypted with a second encryption key;

and further comprising the steps of:
providing each of the recipients with a media reading device having a machine readable copy of the second encryption key stored therein;
initiating reading one of the media on one of the media reading devices;
reading the stored copy of the second encryption key;
and wherein step (e) comprises the steps of:
using the read copy of the second encryption key to decrypt the encrypted copy of the first encryption key which is provided on the media; and
using the decrypted first encryption key to decrypt the encrypted data files on the media.

3. The method of claim 1 comprising the further steps of:
providing a media identifier and a security program initiator on each of the media;
providing a common security program and a unique reading device identifier on each reading device;
initiating reading of one of the media on one of the media reading devices;
initiating the security program in response to reading the security program initiator;
utilizing the security program to access the unique reading device identifier of the reading devices and the media identifier of the media being read;
inputting to the reading device the group access map indicative of particular files which are to be accessed;
inputting to the reading device the password;
and wherein step (g) comprises:
performing a verification operation to establish that a predetermined correlation exists among the password, reading device identifier, media identifier, and group access map.

4. The method of claim 1 comprising the steps of:
logically assigning each data file to a file group based upon predetermined criteria and assigning a unique file group number to each file group;
logically dividing the area on the disk on which data files are stored into a plurality contiguous physical regions wherein each data file is contained within a single region and wherein no region contains data files of more than one file group;
creating a region access map indicating the group number of the files in each region and indicating the disk location of each region and providing the region access map on the media;
and wherein step (f) comprises:
comparing the group access map to the region access map to determine the region locations of the data files in each of the file groups to which access is desired; and
providing access to these determined regions.

5. A method of distributing a plurality of data files to a plurality of recipients comprising the steps of:
creating a plurality of identical media which each contain copies of the plurality of data files encrypted with a first encryption key and which each contain a copy of the first encryption key encrypted with a second encryption key;
providing each of the recipients with a media reading device having a machine readable copy of the second encryption key stored therein;
initiating reading of one of the media on one of the media reading devices;

reading the stored copy of the second encryption key;

using the read copy of the second encryption key to decrypt the encrypted copy of the first encryption key which is provided on the media; and using the decrypted first encryption key to decrypt the encrypted data files on the media.

6. A method of distributing a plurality of data files to a plurality of recipients comprising the steps of:

creating a set of identical media which contain copies of the plurality of data files, a media identifier, and a security program initiator;

providing the recipients with secured media reading devices which each contain a common security program and which each contain a unique reading device identifier;

initiating reading of one of the media on one of the media reading devices;

initiating the security program in response to reading the security program initiator;

inputting to the reading device a group access map indicative of particular files which are to be accessed;

inputting to the reading device a password which is correlated to the unique reading device identifier of the reading device being used and to the media identifier of the media being read and to the input group access map;

utilizing the security program to access the unique reading device identifier of the reading device and the media identifier of the media being read;

performing a verification operation to establish that a predetermined correlation exists among the password, reading device identifier, media identifier, and group access map; and providing access to the selected data files indicated by the group access map in response to establishing the correlation.

7. A method of providing access to selected sets of data files which are provided on a digital data storage media comprising the steps of:

logically assigning each data file to a file group based upon predetermined criteria and assigning a unique file group number to each file group;

logically dividing the area on the disk on which data files are stored into a plurality of contiguous physical regions wherein each data file is contained within a single region and wherein no region contains data files of more than one file group;

providing a region access map indicating the group number of the files in each region and indicating the disk location of each region and providing the region access map list on the media;

creating a group access map indicating the file group numbers of the file groups to which access is desired;

comparing the group access map to the region access map to determine the region locations of the data files in each of the file groups to which access is desired; and providing access to each of these determined regions.

8. A method of distributing a plurality of data files to a plurality of recipients comprising the steps of:

creating a plurality of identical media which each contain copies of the plurality of data files encrypted with a first encryption key, a copy of the first encryption key encrypted with a second encryption key, a media identifier, and a security program initiator;

logically assigning each data file to a file group based upon predetermined criteria and assigning a unique file group number to each file group;

logically dividing the area on the disk on which data files are stored into a plurality of contiguous physical regions wherein each data file is contained within a single region and wherein no region contains data files of more than one file group;

providing a region access map indicating the group number of the files in each region and indicating the disk location of each region and providing the region access map on the media;

creating a group access map indicating the file group numbers of the file groups to which access is desired;

providing each of the recipients with a media reading device having firmware including a copy of the second encryption key, a unique reading device identifier, and a security program;

initiating reading of one of the media on one of the media reading devices;

initiating the security program in response to reading the security program initiator;

inputting to the reading device the group access map indicative of particular file groups which are to be accessed;

inputting to the reading device a password which is correlated to the unique reading device identifier of the reading device being used and to the media identifier of the media being read and to the input group access map;

utilizing the security program to access the unique reading device identifier of the reading device and the media identifier of the media being read;

utilizing the security program to perform a verification operation to establish that a predetermined correlation exists among the password, reading device identifier, media identifier, and group access map;

utilizing the security program to compare the group access map to the region access map to determine the region locations of the data files in each of the file groups to which access is desired and providing a recipient access to each of these determined regions;

utilizing the security program to read the stored copy of the second encryption key;

utilizing the security program to use the read copy of the second encryption key to decrypt the encrypted copy of the first encryption key which is provided on the media; and utilizing the security program to use the decrypted first encryption key to decrypt the encrypted data files on the media regions accessed by the recipient.

9. The method of claim 2 wherein each media reading device is provided with a recipient inaccessible decryption unit and wherein each decryption step comprises the steps of:

providing a key to the decryption unit; and using the decryption unit to decrypt data.

10. The method of claim 5 wherein each media reading device is provided with a recipient inaccessible decryption unit and wherein each decryption step comprises the steps of:

providing a key to the decryption unit; and using the decryption unit to decrypt data.

11. The method of claim 8 wherein each media reading device is provided with a recipient inaccessible decryption unit and wherein each decryption step comprises the steps of:
  providing a key to the decryption unit; and
  using the decryption unit to decrypt data.

12. The method of claim 3 wherein the step of performing a verification operation comprises the steps of:
  decrypting the group access map using the unique reading device identifier as a key;
  performing a mathematical operation involving the decrypted group access map and the media identifier and obtaining a mathematical operation result;
  comparing the mathematical operation result to the password; and
  providing the recipient access to the file groups indicated by the group access map when the mathematical operation result matches the password.

13. The method of claim 12 wherein the decrypted group access map comprises a string of binary digits of predetermined length and wherein the mathematical operation comprises the steps of:
  dividing the decrypted group access map string of binary digits into a predetermined number of equal length segments; and
  adding the equal length segments and the media identifier together to obtain a sum.

14. The method of claim 6 wherein the step of performing a verification operation comprises the steps of:
  decrypting the group access map using the unique reading device identifier as a key;
  performing a mathematical operation involving the decrypted group access map and the media identifier and obtaining a mathematical operation result;
  comparing the mathematical operation result to the password; and
  providing the recipient access to the file groups indicated by the group access map when the mathematical operation result matches the password.

15. The method of claim 14 wherein the decrypted group access map comprises a string of binary digits of predetermined length and wherein the mathematical operation comprises the steps of:
  dividing the decrypted group access map string of binary digits into a predetermined number of equal length segments; and
  adding the equal length segments and the media identifier together to obtain a sum.

16. The method of claim 8 wherein the step of performing a verification operation comprises the steps of:
  decrypting the group access map using the unique reading device identifier as a key;
  performing a mathematical operation involving the decrypted group access map and the media identifier and obtaining a mathematical operation result;
  comparing the mathematical operation result to the password; and
  providing the recipient access to the file groups indicated by the group access map when the mathematical operation result matches the password.

17. The method of claim 16 wherein the decrypted group access map comprises a string of binary digits of predetermined length and wherein the mathematical operation comprises the steps of:
  dividing the decrypted group access map string of binary digits into a predetermined number of equal length segments; and
  adding the equal length segments and the media identifier together to obtain a sum.

* * * * *